US011227529B2

(12) United States Patent
Hu

(10) Patent No.: US 11,227,529 B2
(45) Date of Patent: Jan. 18, 2022

(54) DATA CONVERSION METHOD, DISPLAY METHOD, DATA CONVERSION DEVICE AND DISPLAY DEVICE

(71) Applicant: BOE TECHNOLOGY GROUP CO., LTD., Beijing (CN)

(72) Inventor: Junbo Hu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 108 days.

(21) Appl. No.: 16/476,103

(22) PCT Filed: Dec. 14, 2018

(86) PCT No.: PCT/CN2018/121104
§ 371 (c)(1),
(2) Date: Jul. 4, 2019

(87) PCT Pub. No.: WO2019/120139
PCT Pub. Date: Jun. 27, 2019

(65) Prior Publication Data

US 2019/0355293 A1 Nov. 21, 2019

(30) Foreign Application Priority Data

Dec. 18, 2017 (CN) ......................... 201711366699.3

(51) Int. Cl.
*G06F 3/038* (2013.01)
*G09G 3/20* (2006.01)
(Continued)

(52) U.S. Cl.
CPC ........... *G09G 3/2074* (2013.01); *G09G 3/204* (2013.01); *G09G 3/3607* (2013.01); *G09G 5/005* (2013.01);
(Continued)

(58) Field of Classification Search
CPC .... G09G 3/2074; G09G 3/204; G09G 3/3607; G09G 5/005
(Continued)

(56) References Cited

U.S. PATENT DOCUMENTS

2005/0225548 A1 10/2005 Han et al.
2008/0316189 A1 12/2008 Choi et al.
(Continued)

FOREIGN PATENT DOCUMENTS

CN 104346770 A 2/2015
CN 104599654 A 5/2015
(Continued)

OTHER PUBLICATIONS

International Search report issued in International Application No. PCT/CN2018/121104, dated Feb. 27, 2019, 10 pages.
(Continued)

*Primary Examiner* — Jonathan M Blancha
(74) *Attorney, Agent, or Firm* — Dave Law Group LLC; Raj S. Dave

(57) ABSTRACT

A data conversion method, a display method, a data conversion device and a display device. The data conversion method includes: performing data reorganization on original pixel data corresponding to at least one row of pixels in a display panel to obtain reorganized pixel data. In any data channel, the performing data reorganization on original pixel data corresponding to at least one row of pixels in a display panel to obtain reorganized pixel data includes: a first reorganized part in the n-th reorganized pixel data set consists of a first original part in the (n-1)-th original pixel data set, and a second reorganized part in the n-th reorganized pixel data set consists of a second original part in the n-th original pixel data set, wherein n is an integer satisfying $1<n\leq N$, and N is an integer greater than 1.

19 Claims, 6 Drawing Sheets

(51) Int. Cl.
*G09G 3/36* (2006.01)
*G09G 5/00* (2006.01)

(52) U.S. Cl.
CPC . *G09G 2340/0457* (2013.01); *G09G 2370/00* (2013.01)

(58) Field of Classification Search
USPC .......................................................... 345/204
See application file for complete search history.

(56) References Cited

U.S. PATENT DOCUMENTS

| | | | | |
|---|---|---|---|---|
| 2010/0245368 | A1* | 9/2010 | Chen | G09G 3/20 345/522 |
| 2012/0075188 | A1 | 3/2012 | Kwa et al. | |
| 2013/0021352 | A1* | 1/2013 | Wyatt | G09G 5/395 345/520 |
| 2015/0186098 | A1* | 7/2015 | Hall | H05K 5/0017 345/1.3 |

FOREIGN PATENT DOCUMENTS

| | | | |
|---|---|---|---|
| CN | 105118424 | A | 12/2015 |
| CN | 105336301 | A | 2/2016 |
| CN | 106341639 | A | 1/2017 |
| EP | 2642480 | A1 | 9/2013 |

OTHER PUBLICATIONS

Written Opinion of the International Searching Authority issued in the International Application No. PCT/CN2018/121104, dated Feb. 27, 2019, 4 pages.
Extended European Search Report dated Jul. 22, 2021, for EP patent application No. 18891663.9, 15 pages.
Grzegorz Bieszczad, "Packet based serial link realized in FPGA dedicated for high resolution infrared image transmission," Proceedings of SPIE, IEEE, vol. 9456, May 22, 2015, 8 pages.

* cited by examiner

DATA CONVERSION METHOD, DISPLAY METHOD, DATA CONVERSION DEVICE AND DISPLAY DEVICE

CROSS REFERENCE TO RELATED APPLICATIONS

The present application is the U.S. national stage of International Patent Application No. PCT/CN2018/121104, filed Dec. 14, 2018, which claims the benefit of priority to Chinese patent application No. 201711366699.3, filed on Dec. 18, 2017, the entire disclosures of which are incorporated herein by reference as part of the present application.

TECHNICAL FIELD

Embodiments of the present disclosure relate to a data conversion method, a display method, a data conversion device, and a display device.

BACKGROUND

Because a field programmable gate array (FPGA) has high processing speed and stability, the FPGA is more and more widely used in video processing and panel display.

SUMMARY

At least an embodiment of the present disclosure provides a data conversion method, comprising: performing data reorganization on original pixel data corresponding to at least one row of pixels in a display panel to obtain reorganized pixel data. The original pixel data are transmitted through at least one of data channels according to a first clock cycle, original pixel data transmitted through any one of the data channels is divided into N original pixel data groups according to the first clock cycle, and each of the original pixel data groups comprises a first original portion and a second original portion in a sequential arrangement; the reorganized pixel data are transmitted through at least one of the data channels according to a second clock cycle different from the first clock cycle, reorganized pixel data transmitted through any one of the data channels is divided into a plurality of reorganized pixel data groups according to the first clock cycle, and each of the reorganized pixel data groups comprises a first reorganized portion and a second reorganized portion in a sequential arrangement; for any one of the data channels, the performing data reorganization on the original pixel data corresponding to at least one row of pixels in the display panel to obtain the reorganized pixel data comprises: forming a first reorganized portion of an (n)th reorganized pixel data group by a first original portion of an (n−1)th original pixel data group, and forming a second reorganized portion of the (n)th reorganized pixel data group by a second original portion of an (n)th original pixel data group; and n is an integer satisfying $1<n\leq N$, and N is an integer greater than one.

For example, in the data conversion method provided by an embodiment of the present disclosure, for any one of the data channels, the N original pixel data groups are reorganized to obtain N+1 reorganized pixel data groups; and the performing data reorganization on the original pixel data corresponding to at least one row of pixels in the display panel to obtain the reorganized pixel data further comprises: forming a first reorganized portion of a first reorganized pixel data group by arbitrary data, and forming a second reorganized portion of the first reorganized pixel data group by a second original portion of a first original pixel data group; and forming a first reorganized portion of an (N+1)th reorganized pixel data group by a first original portion of an (n)th original pixel data group, and forming a second reorganized portion of the (N+1)th reorganized pixel data group by arbitrary data.

For example, in the data conversion method provided by an embodiment of the present disclosure, for any one of the data channels, a size of bits of the first original portion is a size of data bits staggered by the second clock cycle with respect to the first clock cycle.

For example, in the data conversion method provided by an embodiment of the present disclosure, in each of the reorganized pixel data groups, a position of each data other than the arbitrary data is identical to a position of the data in the original pixel data group.

For example, in the data conversion method provided by an embodiment of the present disclosure, for any one of the data channels, the data conversion method further comprises: receiving the N original pixel data groups sequentially, and caching at least x bits of data in the (n−1)th original pixel data group in a case of receiving the (n)th original pixel data group; x is a size of data bits comprised in the first original portion; and for any one of the data channels, the performing data reorganization on the original pixel data corresponding to at least one row of pixels in the display panel to obtain the reorganized pixel data comprises: reorganizing the first original portion currently cached of the (n−1)th original pixel data group and the second original portion of the (n)th original pixel data group currently received to form the (n)th reorganized pixel data group.

For example, in the data conversion method provided by an embodiment of the present disclosure, for any one of the data channels, the performing data reorganization on the original pixel data corresponding to at least one row of pixels in the display panel to obtain the reorganized pixel data further comprises: in a case of receiving the first original pixel data group, reorganizing x bits of arbitrary data and the second original portion of the first original pixel data group to form the first reorganized pixel data group.

For example, in the data conversion method provided by an embodiment of the present disclosure, for any one of the data channels, the performing data reorganization on the original pixel data corresponding to at least one row of pixels in the display panel to obtain the reorganized pixel data further comprises: subsequent to receiving a last original pixel data group, caching at least x bits of data of the last original pixel data group, and reorganizing a first original portion cached of the last original pixel data group and y bits of arbitrary data to form a last reorganized pixel data group; and y is a size of data bits comprised in the second original portion.

For example, in the data conversion method provided by an embodiment of the present disclosure, for any one of the data channels, the data conversion method further comprises: receiving the N original pixel data groups sequentially, and caching the N original pixel data groups received; and for any one of the data channels, the performing data reorganization on the original pixel data corresponding to at least one row of pixels in the display panel to obtain the reorganized pixel data comprises: reorganizing a first original portion of a cached (n−1)th original pixel data group and a second original portion of a cached (n)th original pixel data group to form the (n)th reorganized pixel data group.

For example, in the data conversion method provided by an embodiment of the present disclosure, for any one of the data channels, the performing data reorganization on the original pixel data corresponding to at least one row of pixels in the display panel to obtain the reorganized pixel data further comprises: reorganizing x bits of arbitrary data and a second original portion of a cached first original pixel data group to form the first reorganized pixel data group.

For example, in the data conversion method provided by an embodiment of the present disclosure, for any one of the data channels, the performing data reorganization on the original pixel data corresponding to at least one row of pixels in the display panel to obtain the reorganized pixel data further comprises: reorganizing a first original portion of a cached last original pixel data group and y bits of arbitrary data to form a last reorganized pixel data group; and y is a size of data bits comprised in the second original portion.

For example, in the data conversion method provided by an embodiment of the present disclosure, each pixel in the at least one row of pixels comprises three sub-pixels, original pixel data corresponding to each of the three sub-pixels comprises 8 bits of data, and original pixel data corresponding to each pixel comprises 24 bits of data corresponding to the three sub-pixels, three control bits, and one vacant bit.

For example, in the data conversion method provided by an embodiment of the present disclosure, subsequent to the performing data reorganization on the original pixel data corresponding to at least one row of pixels in the display panel to obtain the reorganized pixel data, the data conversion method further comprises: converting the reorganized pixel data to low voltage differential signal for display of the display panel.

For example, in the data conversion method provided by an embodiment of the present disclosure, the performing data reorganization on the original pixel data corresponding to at least one row of pixels in the display panel to obtain the reorganized pixel data comprises: performing data reorganization on original pixel data corresponding to each row of pixels in the display panel respectively according to a drive scanning sequence of the display panel.

At least an embodiment of the present disclosure further provides a display method, comprising: receiving original pixel data corresponding to at least one row of pixels in a display panel, performing data reorganization on the original pixel data to obtain reorganized pixel data, and converting the reorganized pixel data to low voltage differential signal for display of the display panel; and the original pixel data are transmitted through at least one of data channels according to a first clock cycle, and the reorganized pixel data are transmitted through at least one of the data channels according to a second clock cycle different from the first clock cycle.

At least an embodiment of the present disclosure further provides a data conversion device, comprising: a receiving circuit and a reorganizing circuit; the receiving circuit is configured to receive original pixel data corresponding to at least one row of pixels in a display panel; the reorganizing circuit is configured to performing data reorganization on the original pixel data to obtain reorganized pixel data; the original pixel data are transmitted through at least one of data channels according to a first clock cycle, original pixel data transmitted through any one of the data channels is divided into N original pixel data groups according to the first clock cycle, and each of the original pixel data groups comprises a first original portion and a second original portion in a sequential arrangement; the reorganized pixel data are transmitted through at least one of the data channels according to a second clock cycle different from the first clock cycle, reorganized pixel data transmitted through any one of the data channels is divided into a plurality of reorganized pixel data groups according to the first clock cycle, and each of the reorganized pixel data groups comprises a first reorganized portion and a second reorganized portion in a sequential arrangement; for any one of the data channels, the reorganizing circuit is configured to form a first reorganized portion of an (n)th reorganized pixel data group by a first original portion of an (n−1)th original pixel data group, and is configured to form a second reorganized portion of the (n)th reorganized pixel data group by a second original portion of an (n)th original pixel data group; and n is an integer satisfying $1<n\leq N$, and N is an integer greater than one.

For example, in the data conversion device provided by an embodiment of the present disclosure, for any one of the data channels, the N original pixel data groups are reorganized to obtain N+1 reorganized pixel data groups; the reorganizing circuit is further configured to form a first reorganized portion of a first reorganized pixel data group by arbitrary data, and is configured to form a second reorganized portion of the first reorganized pixel data group by a second original portion of a first original pixel data group; and the reorganizing circuit is further configured to form a first reorganized portion of an (N+1)th reorganized pixel data group by a first original portion of an (n)th original pixel data group, and is configured to form a second reorganized portion of the (N+1)th reorganized pixel data group by arbitrary data.

For example, in the data conversion device provided by an embodiment of the present disclosure, for any one of the data channels, a size of bits of the first original portion is a size of data bits staggered by the second clock cycle with respect to the first clock cycle.

For example, in the data conversion device provided by an embodiment of the present disclosure, in each of the reorganized pixel data groups, a position of each data other than the arbitrary data is identical to a position of the data in the original pixel data group.

For example, the data conversion device provided by an embodiment of the present disclosure further comprises a caching circuit; for any one of the data channels, the receiving circuit is configured to receive the N original pixel data groups sequentially; the caching circuit is configured to cache at least x bits of data in the (n−1)th original pixel data group in a case where the receiving circuit receives the (n)th original pixel data group, and x is a size of data bits comprised in the first original portion; and the reorganizing circuit is configured to reorganize the first original portion, currently cached by the caching circuit, of the (n−1)th original pixel data group and the second original portion of the (n)th original pixel data group, currently received by the receiving circuit, to form the (n)th reorganized pixel data group.

For example, in the data conversion device provided by an embodiment of the present disclosure, for any one of the data channels, the reorganizing circuit is further configured to reorganize x bits of arbitrary data and the second original portion of the first original pixel data group to form the first reorganized pixel data group in a case where the receiving circuit receives the first original pixel data group.

For example, in the data conversion device provided by an embodiment of the present disclosure, for any one of the data channels, the caching circuit is further configured to cache at least x bits of data of a last original pixel data group subsequent to the receiving circuit receiving the last original pixel data group; and the reorganizing circuit is further configured to reorganize a first original portion, cached by the caching circuit, of the last original pixel data group and y bits of arbitrary data to form a last reorganized pixel data group, and y is a size of data bits comprised in the second original portion.

For example, the data conversion device provided by an embodiment of the present disclosure further comprises a caching circuit; for any one of the data channels, the receiving circuit is configured to receive the N original pixel data groups sequentially; the caching circuit is configured to cache the N original pixel data groups received by the receiving circuit; and the reorganizing circuit is configured to reorganize a first original portion of an (n−1)th original pixel data group cached by the caching circuit and a second original portion of an (n)th original pixel data group cached by the caching circuit to form the (n)th reorganized pixel data group.

For example, in the data conversion device provided by an embodiment of the present disclosure, for any one of the data channels, the reorganizing circuit is further configured to reorganize x bits of arbitrary data and a second original portion of a first original pixel data group cached by the caching circuit to form the first reorganized pixel data group.

For example, in the data conversion device provided by an embodiment of the present disclosure, for any one of the data channels, the reorganizing circuit is further configured to reorganize a first original portion of a last original pixel data group cached by the caching circuit and y bits of arbitrary data to form a last reorganized pixel data group, and y is a size of data bits comprised in the second original portion.

For example, in the data conversion device provided by an embodiment of the present disclosure, each pixel in the at least one row of pixels comprises three sub-pixels, original pixel data corresponding to each of the three sub-pixels comprises 8 bits of data, and original pixel data corresponding to each pixel comprises 24 bits of data corresponding to the three sub-pixels, three control bits, and one vacant bit.

For example, the data conversion device provided by an embodiment of the present disclosure further comprises a signal converting circuit; and the signal converting circuit is configured to convert the reorganized pixel data to low voltage differential signal for display of the display panel.

At least an embodiment of the present disclosure further provides a display device, comprising the data conversion device provided by any one of the embodiments of the present disclosure.

For example, the display device provided by an embodiment of the present disclosure further comprises a display panel; the receiving circuit and the reorganizing circuit are both integrated in a field programmable gate array, and in a case where the data conversion device comprises a caching circuit, the caching circuit is further integrated in the field programmable gate array; and the field programmable gate array is connected to a signal source to receive the original pixel data, and the field programmable gate array is further connected to the display panel to provide the reorganized pixel data for the display panel.

For example, in the display device provided by an embodiment of the present disclosure, in a case where the data conversion device comprises a signal converting circuit, the signal converting circuit is further integrated in the field programmable gate array.

At least an embodiment of the present disclosure provides a data conversion method, comprising: performing data reorganization on pixel data corresponding to each row of pixels in a display panel; in reorganized pixel data corresponding to any one row of pixels, reorganized pixel data of an (n)th pixel comprises a reorganization of a portion of data in pixel data of an (n−1) pixel in the row of pixels and a portion of data in pixel data of the (n)th pixel in the row of pixels, reorganized pixel data of a first pixel comprises a portion of data in pixel data of the first pixel in the row of pixels, and reorganized pixel data of a last pixel comprises a portion of data in pixel data of the last pixel in the row of pixels; a size of data bits in reorganized pixel data of one pixel subsequent to reorganization is identical to a size of data bits in pixel data of one pixel prior to reorganization; and n is an integer satisfying $1<n\leq N$, and N is an amount of pixels comprised in any one row of pixels in the display panel.

For example, in the data conversion method provided by an embodiment of the present disclosure, performing data reorganization on pixel data corresponding to each row of pixels in the display panel comprises: performing data reorganization on pixel data corresponding to each row of pixels according to a predetermined size x of shift bits; in reorganized pixel data corresponding to any one row of pixels, reorganized pixel data of the (n)th pixel comprises a reorganization of first x bits of data in pixel data of the (n−1)th pixel in the row of pixels and last y bits of data in pixel data of the (n)th pixel in the row of pixels, reorganized pixel data of the first pixel comprises x bits of arbitrary data and last y bits of data in pixel data of the first pixel in the row of pixels, and reorganized pixel data of the last pixel comprises first x bits of data in pixel data of the last pixel in the row of pixels and y bits of arbitrary data; and pixel data of each pixel comprises (x+y) bits of data, and x and y are integers greater than zero.

For example, in the data conversion method provided by an embodiment of the present disclosure, in reorganized pixel data corresponding to each pixel, a position of each data other than the arbitrary data is identical to a position of the data in pixel data prior to reorganization.

For example, in the data conversion method provided by an embodiment of the present disclosure, performing data reorganization on pixel data corresponding to each row of pixels in the display panel further comprises: receiving pixel data of each pixel in one row of pixels sequentially, and caching pixel data of the (n−1)th pixel in a case of receiving pixel data of the (n)th pixel; and performing data reorganization on pixel data corresponding to each row of pixels according to the predetermined size x of shift bits comprises: according to the predetermined size x of shift bits, reorganizing first x bits of data in pixel data currently cached of the (n−1)th pixel and last y bits of data in pixel data currently received of the (n)th pixel to form reorganized pixel data of the (n)th pixel.

For example, the data conversion method provided by an embodiment of the present disclosure further comprises: reorganizing x bits of arbitrary data and last y bits of data in pixel data of the first pixel to form reorganized pixel data of the first pixel in a case of receiving pixel data of the first pixel in the row of pixels.

For example, the data conversion method provided by an embodiment of the present disclosure further comprises: caching pixel data of the last pixel and reorganizing first x bits of data in pixel data cached of the last pixel and y bits of arbitrary data to form reorganized pixel data of the last pixel subsequent to receiving pixel data of the last pixel in the row of pixels.

For example, in the data conversion method provided by an embodiment of the present disclosure, performing data reorganization on pixel data corresponding to each row of pixels in the display panel further comprises: receiving pixel data of each pixel in one row of pixels sequentially; caching pixel data received corresponding to the one row of pixels; and performing data reorganization on pixel data corresponding to each row of pixels according to the predetermined size x of shift bits comprises: according to pixel data cached corresponding to the one row of pixels, reorganizing first x bits of data in pixel data cached of the (n−1)th pixel in the row of pixels and last y bits of data in pixel data cached of the (n)th pixel in the row of pixels to form reorganized pixel data of the (n)th pixel.

For example, the data conversion method provided by an embodiment of the present disclosure further comprises: reorganizing x bits of arbitrary data and last y bits of data in pixel data cached of the first pixel in the one row of pixels to form reorganized pixel data of the first pixel.

For example, the data conversion method provided by an embodiment of the present disclosure further comprises: reorganizing first x bits of data in pixel data cached of the last pixel in the one row of pixels and y bits of arbitrary data to form reorganized pixel data of the last pixel.

For example, in the data conversion method provided by an embodiment of the present disclosure, subsequent to performing data reorganization on pixel data corresponding to each row of pixels in the display panel, the data conversion method further comprises: converting reorganized pixel data to low voltage differential signal for display.

At least an embodiment of the present disclosure further provides a data conversion device, comprising: a receiving module and a reorganizing module; the receiving module is configured to receive pixel data corresponding to each row of pixels in a display panel; the reorganizing module is configured to perform data reorganization on pixel data corresponding to each row of pixels in the display panel; in reorganized pixel data corresponding to any one row of pixels, reorganized pixel data of an (n)th pixel comprises a reorganization of a portion of data in pixel data of an (n−1)th pixel in the row of pixels and a portion of data in pixel data of the (n)th pixel in the row of pixels, reorganized pixel data of a first pixel comprises a portion of data in pixel data of the first pixel in the row of pixels, and reorganized pixel data of a last pixel comprises a portion of data in pixel data of the last pixel in the row of pixels; a size of data bits of reorganized pixel data of one pixel subsequent to reorganization is identical to a size of data bits of pixel data of one pixel prior to reorganization; and n is an integer satisfying $1<n\leq N$, and N is an amount of pixels comprised in any one row of pixels in the display panel.

For example, in the data conversion device provided by an embodiment of the present disclosure, the reorganizing module is configured to: performing data reorganization on pixel data corresponding to each row of pixels according to a predetermined size x of shift bits; in reorganized pixel data corresponding to any one row of pixels, reorganized pixel data of the (n)th pixel comprises a reorganization of first x bits of data in pixel data of the (n−1)th pixel in the row of pixels and last y bits of data in pixel data of the (n)th pixel in the row of pixels, reorganized pixel data of the first pixel comprises x bits of arbitrary data and last y bits of data in pixel data of the first pixel in the row of pixels, and reorganized pixel data of the last pixel comprises first x bits of data in pixel data of the last pixel in the row of pixels and y bits of arbitrary data; and pixel data of each pixel comprises (x+y) bits of data, and x and y are integers greater than zero.

For example, in the data conversion device provided by an embodiment of the present disclosure, in reorganized pixel data corresponding to each pixel, a position of each data other than the arbitrary data is identical to a position of the data in pixel data prior to reorganization.

For example, the data conversion device provided by an embodiment of the present disclosure further comprises a caching module; the receiving module is configured to receive pixel data of each pixel in one row of pixels sequentially; the caching module is configured to cache pixel data of the (n−1)th pixel in a case where the receiving module receives pixel data of the (n)th pixel; and the reorganizing module is configured to reorganize first x bits of data in pixel data currently cached of the (n−1)th pixel and last y bits of data in pixel data currently received of the (n)th pixel according to the predetermined size x of shift bits, to form reorganized pixel data of the (n)th pixel.

For example, in the data conversion device provided by an embodiment of the present disclosure, the reorganizing module is further configured to reorganize x bits of arbitrary data and last y bits of data in pixel data of the first pixel to form reorganized pixel data of the first pixel in a case where the receiving module receives pixel data of the first pixel in the one row of pixels.

For example, in the data conversion device provided by an embodiment of the present disclosure, the caching module is further configured to cache pixel data of the last pixel subsequent to the receiving module receiving pixel data of the last pixel in the one row of pixels; and the reorganizing module is further configured to reorganize first x bits of data in pixel data, cached by the caching module, of the last pixel and y bits of arbitrary data to form reorganized pixel data of the last pixel.

For example, the data conversion device provided by an embodiment of the present disclosure further comprises a caching module; the receiving module is configured to receive pixel data of each pixel in one row of pixels sequentially; the caching module is configured to cache pixel data, received by the receiving module, corresponding to the one row of pixels; and the reorganizing module is configured to reorganize first x bits of data in pixel data cached of the (n−1)th pixel in the row of pixels and last y bits of data in pixel data cached of the (n)th pixel in the row of pixels according to pixel data, cached by the caching module, corresponding to the one row of pixels, to form reorganized pixel data of the (n)th pixel.

For example, in the data conversion device provided by an embodiment of the present disclosure, the reorganizing module is further configured to reorganize x bits of arbitrary data and last y bits of data in pixel data, cached by the caching module, of the first pixel in the one row of pixels to form reorganized pixel data of the first pixel.

For example, in the data conversion device provided by an embodiment of the present disclosure, the reorganizing module is further configured to reorganize first x bits of data in pixel data, cached by the caching module, of the last pixel in the one row of pixels and y bits of arbitrary data to form reorganized pixel data of the last pixel.

For example, the data conversion device provided by an embodiment of the present disclosure further comprises a signal converting module, and the signal converting module is configured to convert reorganized pixel data, obtained by the reorganizing module, to low voltage differential signal for display.

For example, in the data conversion device provided by an embodiment of the present disclosure, the receiving module and the reorganizing module are both integrated in a field programmable gate array; in a case where the data conversion device comprises a caching module, the caching module is further integrated in the field programmable gate array; and in a case where the data conversion device comprises a signal converting module, the signal converting module is further integrated in the field programmable gate array.

At least an embodiment of the present disclosure further provides a display device, comprising the data conversion device provided by any one of the embodiments of the present disclosure.

BRIEF DESCRIPTION OF THE DRAWINGS

In order to clearly illustrate the technical solution of the embodiments of the present disclosure, the drawings of the embodiments will be briefly described in the following. It is obvious that the described drawings in the following are only related to some embodiments of the present disclosure and thus are not limitative of the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", "coupled", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
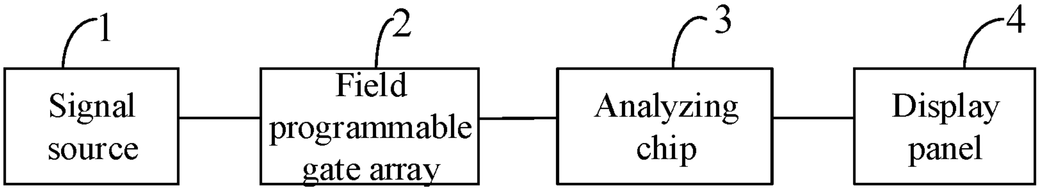
FIG. 1 is a schematic diagram of a solution of applying an FPGA to a display panel.

As illustrated in FIG. 1, in a case where a display panel 4 is in display, pixel data signals input by a signal source 1 are converted into transistor-transistor logic (TTL) level signals through a field programmable gate array (FPGA) 2, then an analyzing chip 3 which is mounted outside the field programmable gate array 2 converts the TTL signals into low voltage differential signals (LVDS), and the low voltage differential signals are then transmitted to the display panel 4 for display.

Because the above display method requires mounting one analyzing chip outside the field programmable gate array, the cost may be high.

Figure 2A:
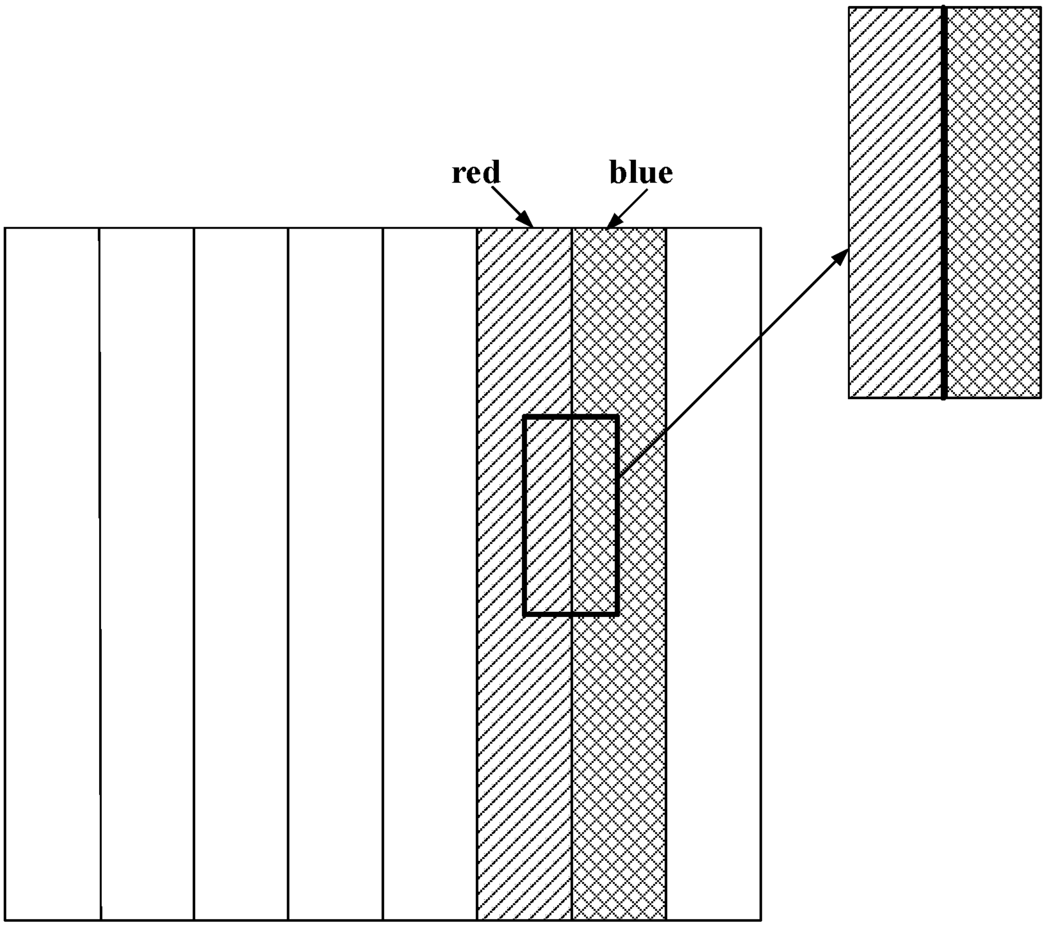
FIG. 2A and FIG. 2B are schematic diagrams of a principle of an abnormal display image, respectively.
Figure 2B:
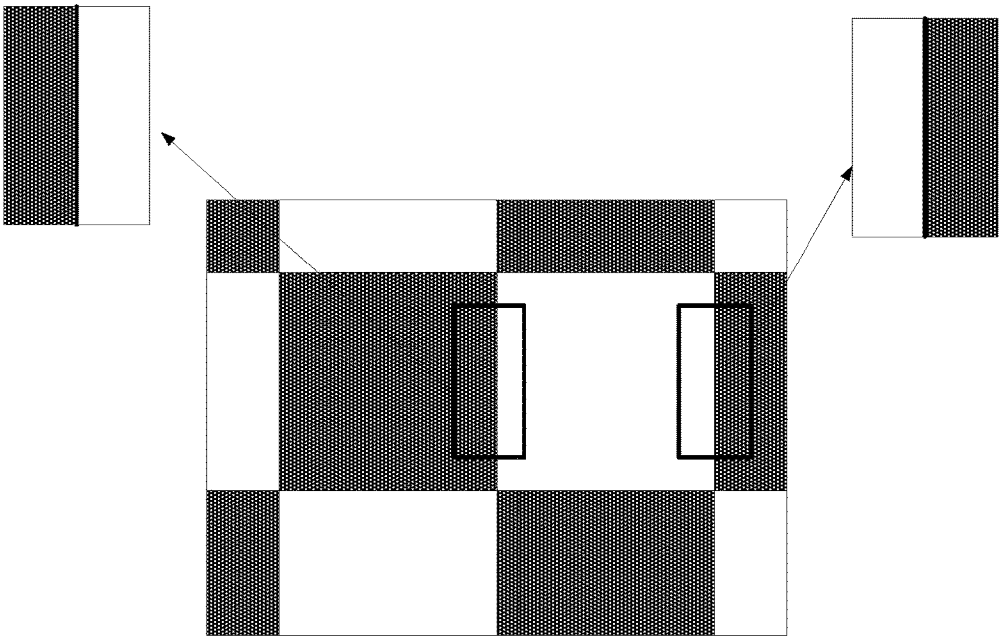

In order to avoid mounting the analyzing chip outside the FPGA, the FPGA can be used to directly call its internal LVDS IP core resource, and the pixel data which is input to the FPGA is directly converted into LVDS through the LVDS IP core and then sent to the display panel for display. However, in a case where the display panel is in display, there may be an abnormal image. For example, as illustrated in FIG. 2A, a black stripe visible to naked eyes appears between a red stripe and a blue stripe. When the black stripe is observed under a microscope, it can be found that the black stripe actually has color, and the color is red and has a low brightness. In addition, as illustrated in FIG. 2B, when a black color changes to a white color, one column of pixels between black pixels and white pixels only display red, but the brightness of the red color is darker than the brightness of the red sub-pixel in the white pixel on the right side. When the white color changes to the black color, one column of pixels between white pixels and black pixels are red, green and blue (R/G/B), but the brightness of the red sub-pixel is low. It can be seen that if the LVDS IP core resource inside the FPGA is directly called, the pixels, adjacent to a switching point, in two regions of different colors in an image may be in abnormal display when the pixel data is converted into the LVDS for display.

The applicant further studies the above abnormal phenomenon, and inputs pixel data corresponding to a specific image to a FPGA in an experiment. For example, the specific image is white, black, black, white, black and black (for example, only lighting the highest data of RGB sub-pixels: R7, B7, and G7). But when the display panel is in display, the display panel occurs an abnormal image phenomenon observed with a microscope. That is, if the display panel is in normal display, the arrangement of each sub-pixel in the display panel observed under the microscope should be as shown in Table 1.

TABLE 1

| B | G | R | B | G | R | B | G | R | B | G | R |
|---|---|---|---|---|---|---|---|---|---|---|---|
| 1 | 1 | 1 | 0 | 0 | 0 | 0 | 0 | 0 | 1 | 1 | 1 |

However, the arrangement sequence in Table 2 appears when the display panel is observed with the microscope.

TABLE 2

| B | G | R | B | G | R | B | G | R | B | G | R |
|---|---|---|---|---|---|---|---|---|---|---|---|
| 1 | 1 | 0 | 0 | 0 | 1 | 0 | 0 | 0 | 1 | 1 | 0 |

By comparing Table 1 and Table 2, it can be found that the R7 data of the red sub-pixel (R) is shifted. By being verified by a plurality of experiments, the abnormal phenomenon is caused by the shift of the pixel data. Then the study finds that because the LVDS standard output from the LVDS IP core is inconsistent with the data mapping in the video electronics standards association (VESA) standard of the display panel, the shift of pixel data occurs.

The embodiments of the present disclosure provide a data conversion method, a display method, a data conversion device, and a display device. By allowing the LVDS standard which is output from the LVDS IP core in the FGPA to be consistent with the data mapping in the VESA signal standard of the back-end display panel, the display panel can be in normal display without the analyzing chip being mounted outside the field programmable gate array, thereby reducing the cost.

The shape and size of each component in accompanying drawings do not indicate a real scale, and are merely intended to illustrate the content of the present disclosure.

The embodiments of the present disclosure provide a data conversion method. For example, the data conversion method can be applied to a display panel for display. The data conversion method includes: performing data reorganization on original pixel data corresponding to at least one row of pixels in a display panel to obtain reorganized pixel data. It should be noted that, in the embodiments of the present disclosure, data before being performed data reorganization is referred to as original pixel data, and data obtained by performing data reorganization on original pixel data is referred to as reorganized pixel data. The following embodiments are the same as those described herein, and details will not be described again.

The original pixel data are transmitted through at least one of data channels according to a first clock cycle, original pixel data transmitted through any one of the data channels is divided into N original pixel data groups according to the first clock cycle, and each of the original pixel data groups includes a first original portion and a second original portion in a sequential arrangement.

The reorganized pixel data are transmitted through at least one of the data channels according to a second clock cycle different from the first clock cycle, reorganized pixel data transmitted through any one of the data channels is divided into a plurality of reorganized pixel data groups according to the first clock cycle, and each of the reorganized pixel data groups includes a first reorganized portion and a second reorganized portion in a sequential arrangement.

For any one of the data channels, the performing data reorganization on the original pixel data corresponding to at least one row of pixels in the display panel to obtain the reorganized pixel data includes: forming a first reorganized portion of an (n)th reorganized pixel data group by a first original portion of an (n−1)th original pixel data group, and forming a second reorganized portion of the (n)th reorganized pixel data group by a second original portion of an (n)th original pixel data group; and n is an integer satisfying 1<n≤N, and N is an integer greater than one.

Figure 3:
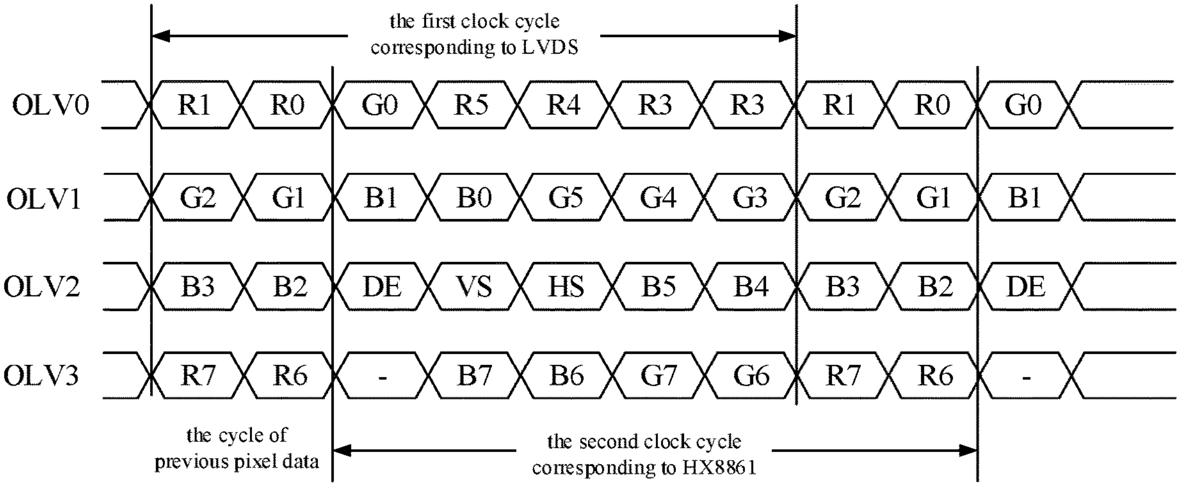
FIG. 3 is a schematic diagram of data mapping of low voltage differential signal in a chip provided by an embodiment of the present disclosure.

For example, as illustrated in FIG. 3, in one example, original pixel data can be transmitted through four data channels (OLV0, OLV1, OLV2, and OLV3) according to a first clock cycle, and for example, the first clock cycle corresponds to the cycle of the LVDS standard. That is, for any one of the data channels, the LVDS standard considers the data in a same first clock cycle as data corresponding to a same pixel.

Accordingly, the reorganized pixel data can also be transmitted through the above four data channels, but the reorganized pixel data are transmitted according to a second clock cycle. For example, in one example, the second clock cycle corresponds to the cycle of the VESA standard of the display panel. For example, in a case where the display panel uses an HX8861 chip, the second clock cycle corresponds to the cycle of the HX8861 signal standard. That is, for any one of the data channels, the HX8861 signal standard considers data in a same second clock cycle as the data corresponding to a same pixel.

As illustrated in FIG. 3, if the original pixel data is not processed, the original pixel data are transmitted to the display panel according to the first clock cycle (e.g., the LVDS standard), and the original pixel data is in display according to the second clock cycle (e.g., the VESA signal standard) during the display of the display panel. In this case, because of the difference between the two signal standards, the display panel may be in abnormal display when the original pixel data is displayed.

For example, for any one of the data channels, a size of bits of the first original portion is a size of data bits staggered by the second clock cycle with respect to the first clock cycle. As illustrated in FIG. 3, in this example, the first clock cycle and the second clock cycle are staggered by two data bits, that is, the size of bits (i.e., the number of bits) of the first original portion is 2. Simultaneously, in the embodiments of the present disclosure, the size of data bits (i.e., the number of data bits) staggered by the second clock cycle with respect to the first clock cycle is defined as x, "the size of shift bits", that is, in the example illustrated in FIG. 3, the size x of shift bits is 2 (i.e., x=2). The embodiments of the present disclosure include, but are not limited thereto, the size of shift bits can be determined according to the signal standard actually used, and for example, the size x of shift bits can be obtained in advance.

In some embodiments of the present disclosure, for example, each pixel includes three sub-pixels (a red sub-pixel R, a green sub-pixel G, and a blue sub-pixel B), original pixel data corresponding to each sub-pixel includes 8 bits of data, and original pixel data corresponding to each pixel includes 24 bits of data corresponding to the three sub-pixels, three control bits (DE, VS, and HS), and one vacant bit (indicated by "-" in the channel OLV3 as illustrated in the figure). The 28 bits of original pixel data corresponding to each pixel are transmitted through four data channels, and each data channel transmits 7 bits of original pixel data, that is, each original pixel data group includes 7 bits of data.

Accordingly, the reorganized pixel data obtained by data reorganization are also transmitted through the four data channels, and each data channel transmits 7 bits of reorganized pixel data, that is, each reorganized pixel data group includes 7 bits of data. In addition, in the example illustrated in FIG. 3, the first original portion of each original pixel data group includes two bits of data, and the second original portion of each original pixel data group includes five bits of data; and accordingly, the first reorganized portion of each reorganized pixel data group includes two bits of data, and the second reorganized portion of each reorganized pixel data group includes five bits of data. The embodiments of the present disclosure include, but are not limited thereto, and the size of data bits included in the original pixel data group (or the reorganized pixel data group), the size of bits of the first original portion (or the first reorganized portion), and the size of bits of the second original portion (or the second reorganized portion) may be different according to different signal standards and the different size x of shift bits.

It should be noted that, in the embodiments of the present disclosure, the size of data bits included in the first reorganized portion is identical to the size of data bits included in the first original portion, and the size of data bits included in the second reorganized portion is identical to the size of data bits included in the second original portion. The following embodiments are the same as the above, and details will not be described again.

The data conversion method provided by at least one embodiment of the present disclosure performs data reorganization on the original pixel data corresponding to at least one row of pixels in the display panel to obtain the reorganized pixel data, so that for any one of the data channels, the first reorganized portion of the (n)th reorganized pixel data group includes the first original portion of the (n−1)th original pixel data group, and the second reorganized portion of the (n)th reorganized pixel data group includes the second original portion of the (n)th original pixel data group. Therefore, the obtained reorganized pixel data which is converted into the LVDS can be consistent with the data mapping in the VESA signal standard of the display panel, so that the display panel can be in normal display without the analyzing chip being mounted outside the field programmable gate array, thereby reducing the cost.

It should be noted that the data conversion method provided by the embodiment of the present disclosure do not limit the implemented object. For example, the data conversion method can be used for original pixel data corresponding to one row of pixels in the display panel, and can further be used for original pixel data corresponding to rows of pixels in the display panel.

As illustrated in FIG. 3, in the embodiments of the present disclosure, four data channels are taken as an example for description, and the embodiments of the present disclosure include but are not limited thereto. The amount of the data channels can be set according to requirements and application scenarios during the transmission of original pixel data, and for example, original pixel data can also be transmitted through one, two, three, five or more data channels.

For example, in the data conversion method provided by the embodiment of the present disclosure, subsequent to the performing data reorganization on the original pixel data corresponding to at least one row of pixels in the display panel to obtain the reorganized pixel data, the data conversion method further includes: converting the reorganized pixel data to low voltage differential signal (the LVDS) for display of the display panel.

For example, in the data conversion method provided by the embodiment of the present disclosure, for any one of the data channels, the N original pixel data groups are reorganized to obtain N+1 reorganized pixel data groups. The performing data reorganization on the original pixel data corresponding to at least one row of pixels in the display panel to obtain the reorganized pixel data further includes: forming a first reorganized portion of a first reorganized pixel data group by arbitrary data, and forming a second reorganized portion of the first reorganized pixel data group by a second original portion of a first original pixel data group; and forming a first reorganized portion of an (N+1)th reorganized pixel data group by a first original portion of an (N)th original pixel data group, and forming a second reorganized portion of the (N+1)th reorganized pixel data group by arbitrary data.

For example, in a case where binary data is used, each bit of data in the original pixel data (or reorganized pixel data) may be 0 or 1. Therefore, in the embodiments of the present disclosure, arbitrary data may be 0 or may be 1, and the embodiments of the present disclosure do not limit the specific value of the arbitrary data.

For example, in the data conversion method provided by an embodiment of the present disclosure, taking x=2 (i.e., the size x of shift bits is 2) as an example, the original pixel data prior to reorganization and the reorganized pixel data obtained subsequent to reorganization are as shown in Table 3.

TABLE 3

| | 1 | 2 | 3 | 4 | 5 |
|---|---|---|---|---|---|
| Original pixel data | $A_7A_6A_5A_4A_3A_2A_1$ | $B_7B_6B_5B_4B_3B_2B_1$ | $C_7C_6C_5C_4C_3C_2C_1$ | $D_7D_6D_5D_4D_3D_2D_1$ | |
| Reorganized pixel data | $XXA_5A_4A_3A_2A_1$ | $A_7A_6B_5B_4B_3B_2B_1$ | $B_7B_6C_5C_4C_3C_2C_1$ | $C_7C_6D_5D_4D_3D_2D_1$ | $D_7D_6XXXXX$ |

In Table 3, 7 bits of data is used to describe one original pixel data group (or one reorganized pixel data group). For example, the 7 bits of data here corresponds to data in one data channel in one clock cycle. The “X” in Table 3 indicates arbitrary data. As shown in Table 3, four original pixel data groups are reorganized to obtain five reorganized pixel data groups.

For example, as shown in Table 3, a first original pixel data group is “$A_7A_6A_5A_4A_3A_2A_1$”, a first original portion of the first original pixel data group is “$A_7A_6$”, and a second original portion of the first original pixel data group is “$A_5A_4A_3A_2A_1$”; a second original pixel data group is “$B_7B_6B_5B_4B_3B_2B_1$”, a first original portion of the second original pixel data group is “$B_7B_6$”, and a second original portion of the second original pixel data group is “$B_5B_4B_3B_2B_1$”; a third original pixel data group is “$C_7C_6C_5C_4C_3C_2C_1$”, a first original portion of the third original pixel data group is “$C_7C_6$”, and a second original portion of the third original pixel data group is “$C_5C_4C_3C_2C_1$”; and a fourth original pixel data group is “$D_7D_6D_5D_4D_3D_2D_1$”, a first original portion of the fourth original pixel data group is “$D_7D_6$”, and a second original portion of the fourth original pixel data group is “$D_5D_4D_3D_2D_1$”.

Five reorganized pixel data groups are obtained subsequent to performing data reorganization on the above four original pixel data groups according to the data conversion method provided by the embodiment of the present disclosure. As shown in Table 3, a first reorganized pixel data group includes two bits of arbitrary data "XX", and the second original portion "$A_5A_4A_3A_2A_1$" of the first original pixel data group; a second reorganized pixel data group includes the first original portion "$A_7A_6$" of the first original pixel data group and the second original portion "$B_5B_4B_3B_2B_1$" of the second original pixel data group; a third reorganized pixel data group includes the first original portion "$B_7B_6$" of the second original pixel data group and the second original portion "$C_5C_4C_3C_2C_1$" of the third original pixel data group; a fourth reorganized pixel data group includes the first original portion "$C_7C_6$" of the third original pixel data group and the second original portion "$D_5D_4D_3D_2D_1$" of the fourth original pixel data group; and a fifth reorganized pixel data group includes the first original portion "$D_7D_6$" of the fourth original pixel data group and five bits of arbitrary data "XXXXX".

For example, in the data conversion method provided by the embodiment of the present disclosure, in each of the reorganized pixel data groups, a position of each data other than the arbitrary data is identical to a position of the data in the original pixel data group. It should be noted that, in the embodiments of the present disclosure, "position" means a position of one bit of data in the reorganized pixel data group (or in the original pixel data group). For example, as shown in Table 3, prior to reorganization, A7 is located at a seventh bit of the original pixel data group "$A_7A_6A_5A_4A_3A_2A_1$"; and subsequent to reorganization, A7 is located at a seventh bit of the reorganized pixel data group "$A_7A_6B_5B_4B_3B_2B_1$". That is, before and after reorganization, the position of A7 in one pixel data group (in one original pixel data group or in one reorganized pixel data group) remains unchanged.

For example, the size x of shift bits can be determined based on the signal standard of the chip in the display panel. The following embodiments take the HX8861 chip as an example to describe the above data conversion method provided by the embodiments of the present disclosure.

For example, in some examples, one pixel generally includes three sub-pixels RGB, each sub-pixel corresponds to 8 bits of data, and original pixel data corresponding to one pixel includes 28 bits of data, in which 24 bits of data is data corresponding to three sub-pixels, and other 4 bits of data is data corresponding to the control signal (for example, three control bits DE, VS, and HS, and one vacant bit). For example, the original pixel data corresponding to one pixel are transmitted through four data channels OLV0~OLV3, and each data channel transmits 7 bits of data.

For example, in the four data channels OLV0 to OLV3, the mapping relationship between the first clock cycle corresponding to the LVDS standard and the second clock cycle corresponding to the HX8861 chip signal standard is as illustrated in FIG. 3, and the data channel OLV3 is taken as an example in the following. For example, one original pixel data group is arranged according to the first clock cycle, that is, R7, R6, null, B7, B6, G7, and G6. But when the original pixel data group are transmitted to the HX8861 chip, the HX8861 does not consider it as the data of one cycle. The signal standard of the HX8861 chip considers that the data arrangement (i.e., the reorganized pixel data group) corresponding to the cycle (i.e., the second clock cycle) is null, B7, B6, G7, G6, R7, and R6. In this case, R7 and R6 are pixel data of a next pixel in the LVDS IP core. Therefore, in this channel, it shows that R7 and R6 in the original pixel data of the (n+1)th pixel are shifted to the original pixel data of the (n)th pixel. Similar data shift phenomena occur in the other three signal channels OLV2, OLV1, and OLV0, and the size x of shift bits is 2 (i.e., x=2).

Similarly, the data channel OLV3 is taken as an example. If data conversion is not performed, the arrangement of the data output from the LVDS IP core in the first clock cycle is: R7, R6, null, B7, B6, G7, and G6. But the HX8861 chip in the display panel receives: null, B7, B6, G7, G6, R7, and R6; and R7 and R6 are the data in the next cycle.

After the data is reorganized by the data conversion method provided by the embodiment of the present disclosure, the reorganized pixel data received by the HX8861 chip is still null, B7, B6, G7, G6, R7, and R6. But because the first reorganized portion of the (n)th reorganized pixel data group includes the first original portion of the (n−1)th original pixel data group, and the second reorganized portion of the (n)th reorganized pixel data group includes the second original portion of the (n)th original pixel data group, R7 and R6 still belong to the (n)th original pixel data group in this case, so that the abnormal display phenomenon can be avoided.

Therefore, according to the data conversion method provided by the embodiment of the present disclosure, before the LVDS IP core outputs the LVDS, original pixel data corresponding to at least one row of pixels in the display panel can be performed data reorganization according to the predetermined size x of shift bits. In this way, a LVDS conversion is performed according to the reorganized pixel data obtained subsequent to the reorganization, and then the display operation is performed, thereby solving the problem of abnormal image.

For example, in the data conversion method provided by the embodiment of the present disclosure, for any one of the data channels, the data conversion method further includes: receiving the N original pixel data groups sequentially, and caching at least x bits of data in the (n−1)th original pixel data group in a case of receiving the (n)th original pixel data group; and x is a size of data bits included in the first original portion. For any one of the data channels, the performing data reorganization on the original pixel data corresponding to at least one row of pixels in the display panel to obtain the reorganized pixel data includes: reorganizing the first original portion currently cached of the (n−1)th original pixel data group and the second original portion of the (n)th original pixel data group currently received to form the (n)th reorganized pixel data group.

It should be noted that, because the (n)th reorganized pixel data group includes the first original portion (x bits of data) of the (n−1)th original pixel data group, in a case where the (n−1)th original pixel data group is cached, it is not necessary to cache all data in the (n−1)th original pixel data group. For example, only the first original portion (i.e., x bits of data) of the (n−1)th original pixel data group is cached. Using this caching mode can save the caching space, thereby further reducing the cost.

For example, for any one of the data channels, the performing data reorganization on the original pixel data corresponding to at least one row of pixels in the display panel to obtain the reorganized pixel data further includes: in a case of receiving the first original pixel data group, reorganizing x bits of arbitrary data and the second original portion of the first original pixel data group to form the first reorganized pixel data group.

For example, for any one of the data channels, the performing data reorganization on the original pixel data corresponding to at least one row of pixels in the display panel to obtain the reorganized pixel data further includes: subsequent to receiving a last original pixel data group, caching at least x bits of data of the last original pixel data group, and reorganizing a first original portion cached of the last original pixel data group and y bits of arbitrary data to form a last reorganized pixel data group; and y is a size of data bits included in the second original portion.

Figure 4:
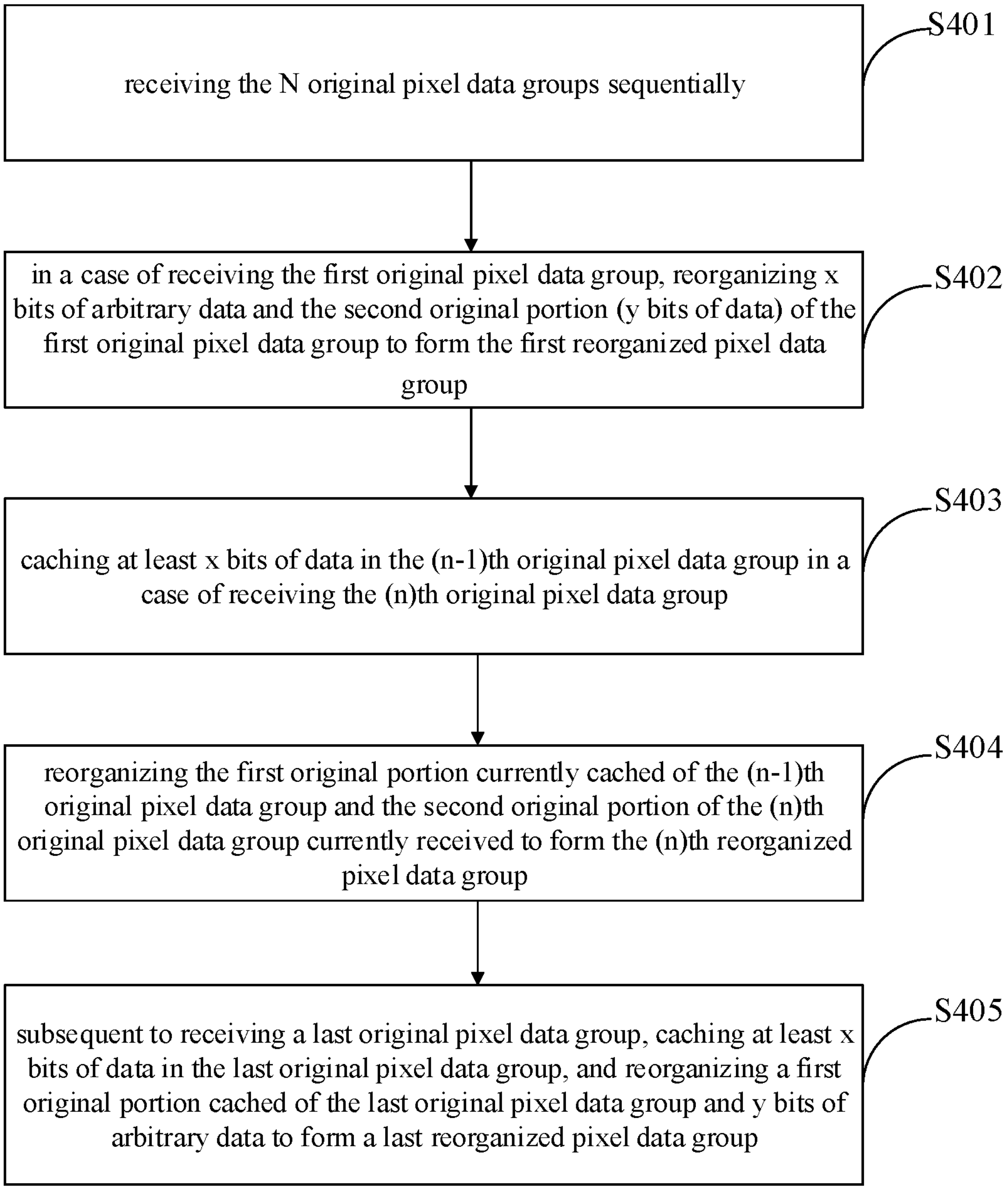
FIG. 4 is a schematic flow diagram of a data conversion method provided by an embodiment of the present disclosure.

For example, as illustrated in FIG. 4, for any one of the data channels, the data conversion method provided by the embodiment of the present disclosure includes the following steps.

S401: receiving the N original pixel data groups sequentially.

S402: in a case of receiving the first original pixel data group, reorganizing x bits of arbitrary data and the second original portion (y bits of data) of the first original pixel data group to form the first reorganized pixel data group.

S403: caching at least x bits of data in the (n−1)th original pixel data group in a case of receiving the (n)th original pixel data group.

S404: reorganizing the first original portion currently cached of the (n−1)th original pixel data group and the second original portion of the (n)th original pixel data group currently received to form the (n)th reorganized pixel data group.

S405: subsequent to receiving a last original pixel data group, caching at least x bits of data in the last original pixel data group, and reorganizing a first original portion cached of the last original pixel data group and y bits of arbitrary data to form a last reorganized pixel data group.

Figure 5:
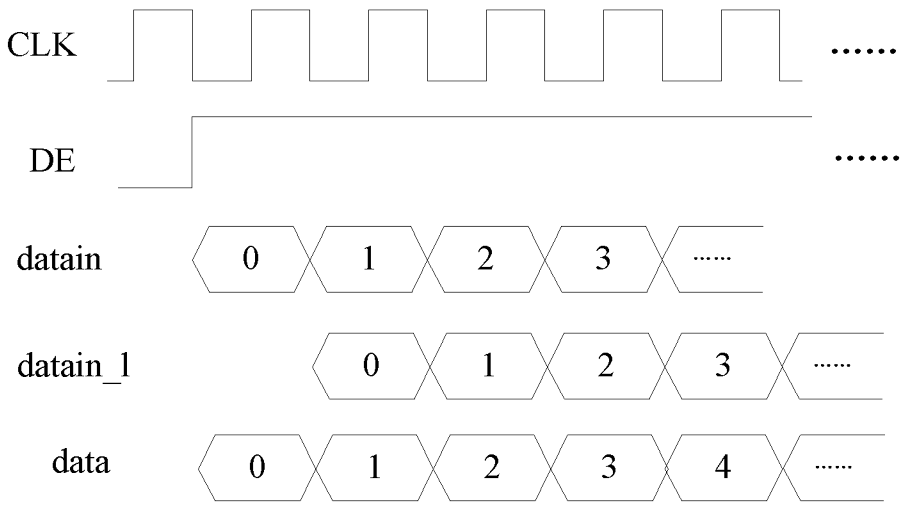
FIG. 5 is a timing diagram corresponding to a data conversion method provided by an embodiment of the present disclosure.

For example, in the data conversion method provided by the embodiment of the present disclosure, the caching of the original pixel data group can delay for one first clock cycle after receiving the original pixel data group. The corresponding timing diagram is as illustrated in FIG. 5. CLK is the first clock cycle signal, and one first clock cycle is used to receive one original pixel data group; DE is a control signal, and when DE is at a high level, the original pixel data starts to be received; and "datain" indicates the original pixel data that is received, "datain_1" indicates the original pixel data that is cached, and "data" indicates the reorganized pixel data after the reorganization. In addition, the relationship of "datain", "datain_1", and "data" is as shown in Table 4.

cached (n−1)th original pixel data group and a second original portion of a cached (n)th original pixel data group to form the (n)th reorganized pixel data group.

For example, for any one of the data channels, the performing data reorganization on the original pixel data corresponding to at least one row of pixels in the display panel to obtain the reorganized pixel data further includes: reorganizing x bits of arbitrary data and a second original portion of a cached first original pixel data group to form the first reorganized pixel data group.

For example, for any one of the data channels, the performing data reorganization on the original pixel data corresponding to at least one row of pixels in the display panel to obtain the reorganized pixel data further includes: reorganizing a first original portion of a cached last original pixel data group and y bits of arbitrary data to form a last reorganized pixel data group; and y is a size of data bits included in the second original portion.

Figure 6:
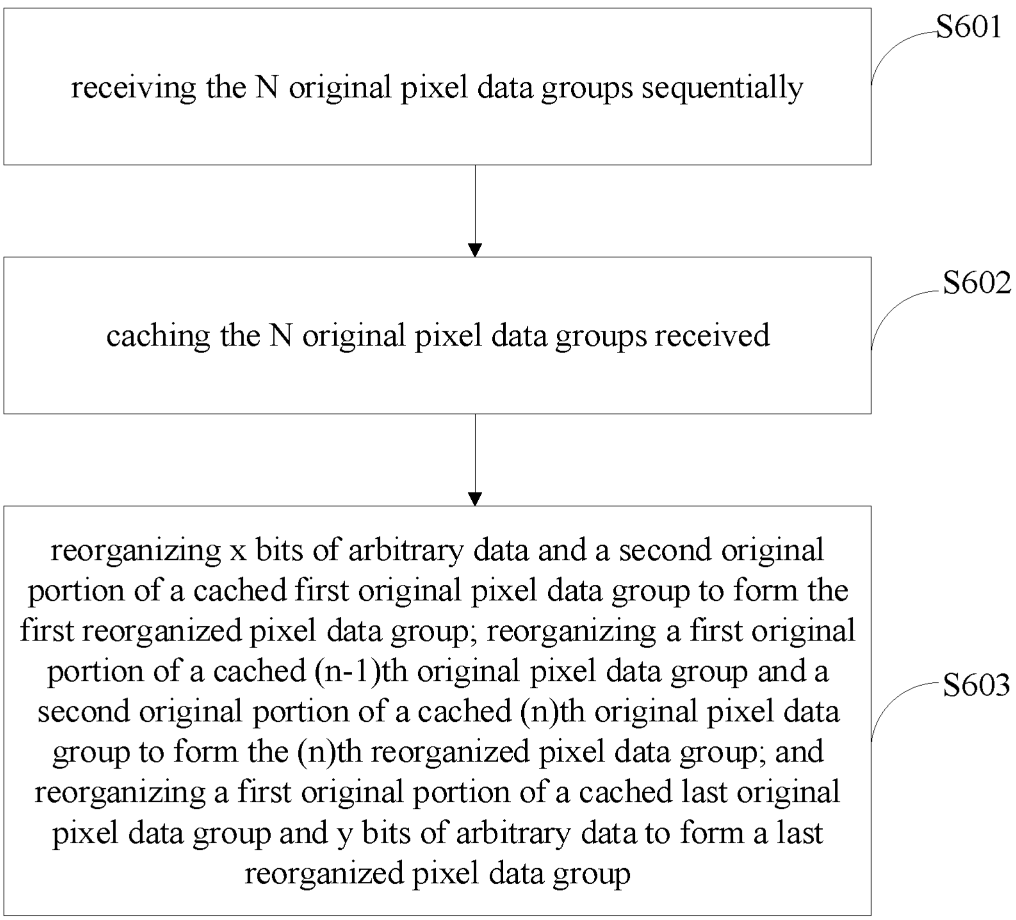
FIG. 6 is a schematic flow diagram of another data conversion method provided by an embodiment of the present disclosure.

For example, as illustrated in FIG. 6, for any one of the data channels, the data conversion method provided by the embodiment of the present disclosure includes the following steps.

S601: receiving the N original pixel data groups sequentially.

S602: caching the N original pixel data groups received.

S603: reorganizing x bits of arbitrary data and a second original portion of a cached first original pixel data group to form the first reorganized pixel data group; reorganizing a first original portion of a cached (n−1)th original pixel data group and a second original portion of a cached (n)th original pixel data group to form the (n)th reorganized pixel data group; and reorganizing a first original portion of a cached last original pixel data group and y bits of arbitrary data to form a last reorganized pixel data group.

For example, in the data conversion method provided by the embodiment of the present disclosure, the data conversion method further includes: performing data reorganization on original pixel data corresponding to each row of pixels in the display panel respectively according to a drive scanning sequence of the display panel.

For example, one display panel includes rows of pixels, and data reorganization of the original pixel data corresponding to each row of pixels in the display panel can be sequentially performed according to the drive scanning

TABLE 4

| | CLK1 | CLK 2 | CLK 3 | CLK 4 | CLK 5 |
|---|---|---|---|---|---|
| datain | $A_7A_6A_5A_4A_3A_2A_1$ | $B_7B_6B_5B_4B_3B_2B_1$ | $C_7C_6C_5C_4C_3C_2C_1$ | $D_7D_6D_5D_4D_3D_2D_1$ | |
| datain_1 | | $A_7A_6A_5A_4A_3A_2A_1$ | $B_7B_6B_5B_4B_3B_2B_1$ | $C_7C_6C_5C_4C_3C_2C_1$ | $D_7D_6D_5D_4D_3D_2D_1$ |
| data | $XXA_5A_4A_3A_2A_1$ | $A_7A_6B_5B_4B_3B_2B_1$ | $B_7B_6C_5C_4C_3C_2C_1$ | $C_7C_6D_5D_4D_3D_2D_1$ | $D_7D_6XXXXX$ |

The above embodiment is an example of caching and reorganizing original pixel data in real time. Certainly, in the embodiments of the present disclosure, the reorganization of the original pixel data can be performed subsequent to caching all the original pixel data in one data channel.

For example, in the data conversion method provided by the embodiment of the present disclosure, for any one of the data channels, the data conversion method further includes: receiving the N original pixel data groups sequentially, and caching the N original pixel data groups received. For any one of the data channels, the performing data reorganization on the original pixel data corresponding to at least one row of pixels in the display panel to obtain the reorganized pixel data includes: reorganizing a first original portion of a sequence of the display panel. It should be noted that the embodiments of the present disclosure include, but are not limited thereto. For example, data reorganization of the original pixel data corresponding to the rows of pixels in the display panel can also be performed according to any sequence, and after original pixel data corresponding to all pixels included in the display panel is reorganized, the display operation is performed.

Figure 11:
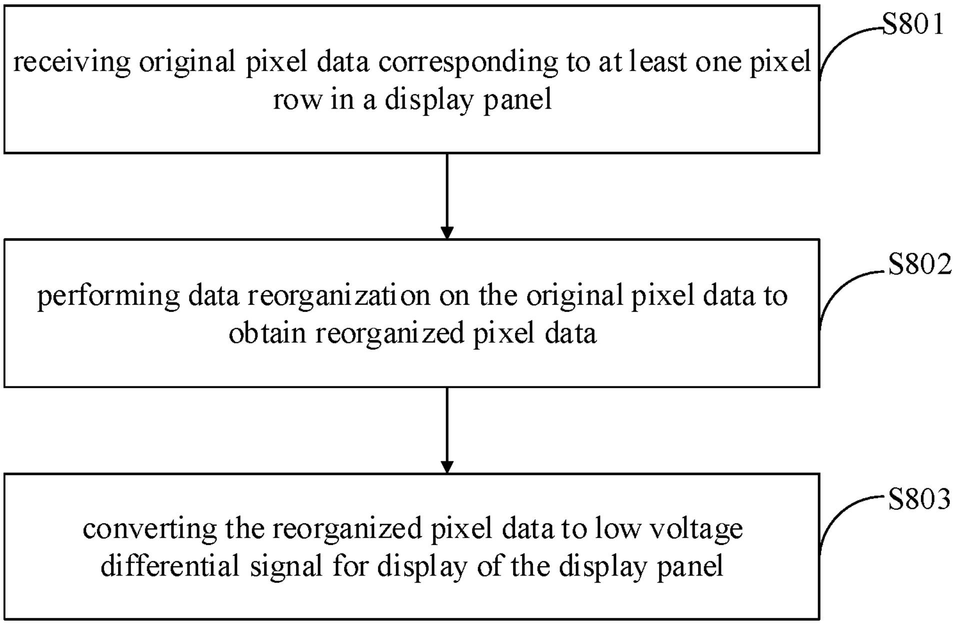
FIG. 11 is a schematic flow diagram of a display method provided by an embodiment of the present disclosure.

At least one embodiment of the present disclosure further provides a display method, and as illustrated in FIG. 11, the display method includes the following steps.

S801: receiving original pixel data corresponding to at least one row of pixels in a display panel.

S802: performing data reorganization on the original pixel data to obtain reorganized pixel data.

S803: converting the reorganized pixel data to low voltage differential signal for display of the display panel.

For example, the original pixel data are transmitted through at least one of data channels according to a first clock cycle, and the reorganized pixel data are transmitted through at least one of the data channels according to a second clock cycle different from the first clock cycle. The description of the data reorganization can be with reference to the corresponding description in the above embodiments regarding the data conversion method, and details will not be described herein again.

Based on the same concept, the embodiments of the present disclosure further provide a data conversion device, and for example, the data conversion device can be used for display of a display panel. Because the principle of solving the problem with the data conversion device is similar to the data conversion method described above, the implementation of the data conversion device can be with reference to the implementation of the data conversion method described above, and the repeated description is omitted.

Figure 7:
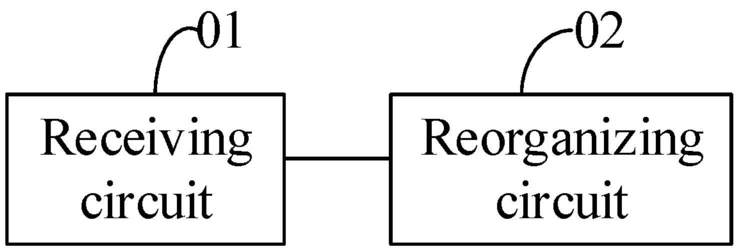
FIG. 7 is a schematic structural diagram of a data conversion device provided by an embodiment of the present disclosure.

At least one embodiment of the present disclosure provides a data conversion device. As illustrated in FIG. 7, the data conversion device includes: a receiving circuit 01 and a reorganizing circuit 02.

For example, the receiving circuit 01 is configured to receive original pixel data corresponding to at least one row of pixels in a display panel.

For example, the reorganizing circuit 02 is configured to perform data reorganization on the original pixel data to obtain reorganized pixel data.

For example, the original pixel data are transmitted through at least one of data channels according to a first clock cycle, original pixel data transmitted through any one of the data channels is divided into N original pixel data groups according to the first clock cycle, and each of the original pixel data groups includes a first original portion and a second original portion in a sequential arrangement. The reorganized pixel data are transmitted through at least one of the data channels according to a second clock cycle different from the first clock cycle, reorganized pixel data transmitted through any one of the data channels is divided into a plurality of reorganized pixel data groups according to the first clock cycle, and each of the reorganized pixel data groups includes a first reorganized portion and a second reorganized portion in a sequential arrangement.

For example, for any one of the data channels, the reorganizing circuit is configured to form a first reorganized portion of an (n)th reorganized pixel data group by a first original portion of an (n−1)th original pixel data group, and is configured to form a second reorganized portion of the (n)th reorganized pixel data group by a second original portion of an (n)th original pixel data group; and n is an integer satisfying $1<n\leq N$, and N is an integer greater than one.

For example, for any one of the data channels, the N original pixel data groups are reorganized to obtain N+1 reorganized pixel data groups. The reorganizing circuit is further configured to form a first reorganized portion of a first reorganized pixel data group by arbitrary data, and is configured to form a second reorganized portion of the first reorganized pixel data group by a second original portion of a first original pixel data group. The reorganizing circuit is further configured to form a first reorganized portion of an (N+1)th reorganized pixel data group by a first original portion of an (n)th original pixel data group, and is configured to form a second reorganized portion of the (N+1)th reorganized pixel data group by arbitrary data.

For example, in the data conversion device provided by the embodiment of the present disclosure, for any one of the data channels, a size of bits of the first original portion is a size of data bits staggered by the second clock cycle with respect to the first clock cycle. That is, the size of bits of the first original portion is the same as the size x of shift bits.

For example, in the data conversion device provided by the embodiment of the present disclosure, in each of the reorganized pixel data groups, a position of each data other than the arbitrary data is identical to a position of the data in the original pixel data group.

Figure 8:
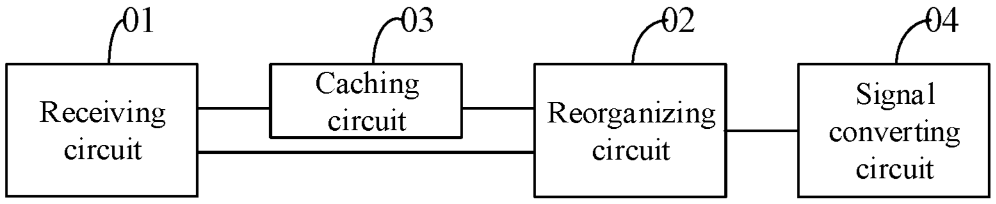
FIG. 8 is a schematic structural diagram of another data conversion device provided by an embodiment of the present disclosure.

For example, in the data conversion device provided by the embodiment of the present disclosure, as illustrated in FIG. 8, the data conversion device further includes a caching circuit 03.

For example, for any one of the data channels, the receiving circuit 01 is configured to receive the N original pixel data groups sequentially.

For example, the caching circuit 03 is configured to cache at least x bits of data in the (n−1)th original pixel data group in a case where the receiving circuit 01 receives the (n)th original pixel data group, and x is a size of data bits included in the first original portion, that is, x is the size of shift bits.

For example, the reorganizing circuit 02 is configured to reorganize the first original portion, currently cached by the caching circuit 03, of the (n−1)th original pixel data group and the second original portion of the (n)th original pixel data group, currently received by the receiving circuit 01, to form the (n)th reorganized pixel data group.

For example, in the data conversion device provided by the embodiment of the present disclosure, for any one of the data channels, the reorganizing circuit 02 is further configured to reorganize x bits of arbitrary data and the second original portion of the first original pixel data group to form the first reorganized pixel data group in a case where the receiving circuit 01 receives the first original pixel data group.

For example, in the data conversion device provided by the embodiment of the present disclosure, for any one of the data channels, the caching circuit 03 is further configured to cache at least x bits of data of a last original pixel data group subsequent to the receiving circuit 01 receiving the last original pixel data group.

For example, the reorganizing circuit 02 is further configured to reorganize a first original portion, cached by the caching circuit 03, of the last original pixel data group and y bits of arbitrary data to form a last reorganized pixel data group; and y is a size of data bits included in the second original portion.

Figure 9:
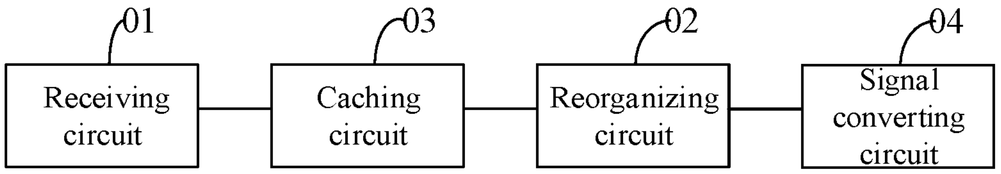
FIG. 9 is a schematic structural diagram of further still another data conversion device provided by an embodiment of the present disclosure.

For example, in the data conversion device provided by an embodiment of the present disclosure, as illustrated in FIG. 9, the data conversion device further includes a caching circuit 03.

For example, for any one of the data channels, the receiving circuit 01 is configured to receive the N original pixel data groups sequentially.

For example, the caching circuit 03 is configured to cache the N original pixel data groups received by the receiving circuit 01.

For example, the reorganizing circuit 02 is configured to reorganize a first original portion of an (n−1)th original pixel data group cached by the caching circuit 03 and a second original portion of an (n)th original pixel data group cached by the caching circuit 03 to form the (n)th reorganized pixel data group.

For example, in the data conversion device provided by the embodiment of the present disclosure, for any one of the data channels, the reorganizing circuit 02 is further configured to reorganize x bits of arbitrary data and a second original portion of a first original pixel data group cached by the caching circuit 03 to form the first reorganized pixel data group.

For example, in the data conversion device provided by the embodiment of the present disclosure, for any one of the data channels, the reorganizing circuit 02 is further configured to reorganize a first original portion of a last original pixel data group cached by the caching circuit 03 and y bits of arbitrary data to form a last reorganized pixel data group. And y is a size of data bits included in the second original portion.

For example, in the data conversion device provided by the embodiment of the present disclosure, each pixel in the at least one row of pixels includes three sub-pixels, original pixel data corresponding to each sub-pixel includes 8 bits of data, and original pixel data corresponding to each pixel includes 24 bits of data corresponding to the three sub-pixels, three control bits, and one vacant bit.

For example, in the data conversion device provided by the embodiment of the present disclosure, as illustrated in FIG. 8 and FIG. 9, the data conversion device further includes a signal converting circuit 04, and the signal converting circuit 04 is configured to convert the reorganized pixel data obtained by the reorganizing circuit 02 to low voltage differential signal for display of the display panel.

For example, in the data conversion device provided by the embodiment of the present disclosure, the receiving circuit, the caching circuit, the reorganizing circuit and the signal converting circuit can all be integrated in the FPGA, that is, the data conversion device provided by the embodiment of the present disclosure is integrated in the FPGA, and in this case, the signal converting circuit is the LVDS IP core in the FPGA.

Based on the same concept, the embodiments of the present disclosure further provide a display device, and the display device includes any one of the above data conversion devices provided by the embodiments of the present disclosure.

Figure 10:
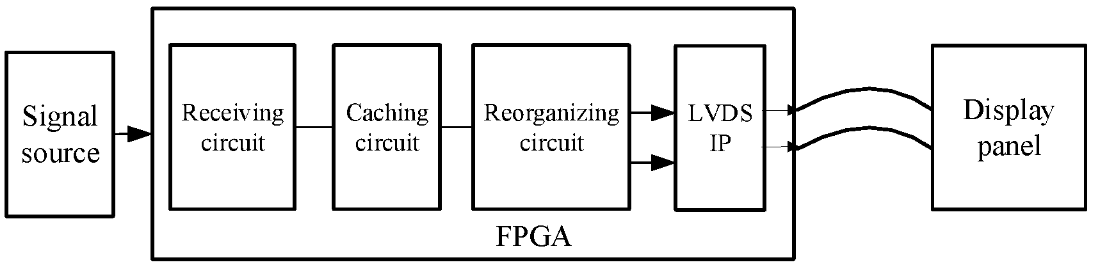
FIG. 10 is a schematic structural diagram of a display device provided by an embodiment of the present disclosure.

For example, as illustrated in FIG. 10, the display device provided by the embodiment of the present disclosure further includes a display panel. The receiving circuit and the reorganizing circuit in the data conversion device are both integrated in a field programmable gate array (FPGA), and in a case where the data conversion device includes a caching circuit, the caching circuit is further integrated in the field programmable gate array.

For example, the field programmable gate array is connected to a signal source to receive the original pixel data, and the field programmable gate array is further connected to the display panel to provide the reorganized pixel data for the display panel.

For example, as illustrated in FIG. 10, in a case where the data conversion device includes a signal converting circuit (e.g., the LVDS IP core), the signal converting circuit can be further integrated in the field programmable gate array.

For example, as illustrated in FIG. 10, the data conversion device is integrated in the field programmable gate array. The receiving circuit in the field programmable gate array receives the original pixel data from the signal source, and the original pixel data is cached by the caching circuit. The reorganizing circuit reorganizes the cached original pixel data to obtain the reorganized pixel data, and then the signal converting circuit (e.g. the LVDS IP core) converts the reorganized pixel data to low voltage differential signal and sends the low voltage differential signal to the display panel. For example, a timing controller (TCON) in the display panel receives the low voltage differential signaling signal, and the display panel performs the display operation according to the low voltage differential signal that is received.

For example, in the embodiments of the present disclosure, the signal source can provide pixel data for the display panel to perform the display operation. For example, the signal source can be a device which is external to the display device, such as a mobile phone, a video camera, or the like, which can output or store pixel data. For another example, the signal source can also be integrated in the field programmable gate array, that is, the signal source and the data conversion device are simultaneously integrated in the field programmable gate array, thereby allowing the field programmable gate array itself to synthesize the required pixel data. The embodiments of the present disclosure do not limit this.

For example, the display device provided by the embodiment of the present disclosure can be any product or component with a display function, such as a mobile phone, a tablet computer, a television, a display screen, a notebook computer, a digital photo frame, a navigator, and the like.

In the data conversion method, the display method, the data conversion device, and the display device provided by the embodiments of the present disclosure, the size x of shift bits can be 1, 2, 3, etc., and the value of the size of shift bits is not limited in the embodiments of the present disclosure. In this way, the data conversion method, the display method, the data conversion device, and the display device provided by the embodiments of the present disclosure can be applied to signal standards of multiple different display chips, thereby improving the universality.

The data conversion method, the display method, the data conversion device, and the display device provided by the embodiments of the present disclosure perform data reorganization on the original pixel data corresponding to at least one row of pixels in the display panel to obtain the reorganized pixel data, thereby for any one of the data channels, forming the first reorganized portion of the (n)th reorganized pixel data group by the first original portion of the (n−1)th original pixel data group, and forming the second reorganized portion of the (n)th reorganized pixel data group by the second original portion of the (n)th original pixel data group. Therefore, after the obtained reorganized pixel data is converted into the LVDS, it can be consistent with the data mapping in the VESA signal standard of the display panel, so that the image can be normally displayed without the analyzing chip being mounted outside the field programmable gate array, thereby reducing the cost.

Those skilled in the art will appreciate that the embodiments of the present disclosure can be implemented as a method, a system, or a computer program product. Therefore, the present disclosure may take the form of an entirely hardware embodiment, an entirely software embodiment, or an embodiment combining the software and hardware. Moreover, the present disclosure may take the form of one or more computer program products which are implemented on computer available storage medium (including but not limited to disk memory, CD-ROM, optical memory, etc.) including computer available program codes.

The present disclosure is described with reference to flow diagrams and/or block diagrams of methods, apparatus (systems), and computer program products according to the embodiments of the present disclosure. It will be understood that each flow and/or block in the flow diagram and/or the block diagram, and a combination of the flow and/or block in the flow diagram and/or the block diagram can be implemented by computer program instructions. These computer program instructions are provided to the processor of a general-purpose computer, a dedicated computer, an embedded processor, or other programmable data processing device to produce a machine, so that the instructions executed by the processor of the computer or other programmable data processing devices can produce the device which is applied to implement functions specified in one or more flows of the flow diagram and/or in one or more blocks of the block diagram.

The computer program instructions can also be stored in the computer readable memory that can direct the computer or other programmable data processing device to operate in a specific manner, so that the instructions stored in the computer readable memory produce a manufacture including the instruction device. The instruction device implements the functions specified in one or more flows of the flow diagram and/or in one or more blocks of the block diagram.

These computer program instructions can also be loaded onto the computer or other programmable data processing devices, and allow a series of operation steps to be performed on the computer or other programmable devices to produce the processing that can be implemented by the computer. Therefore, the instructions executed on the computer or other programmable devices provide steps for implementing the functions specified in one or more flows of the flow diagram and/or in one or more blocks of the block diagram.

What have been described above are only specific implementations of the present disclosure, the protection scope of the present disclosure is not limited thereto, and the protection scope of the present disclosure should be based on the protection scope of the claims.

What is claimed is:

1. A data conversion method, comprising:

performing data reorganization on original pixel data corresponding to at least one row of pixels in a display panel to obtain reorganized pixel data, wherein the original pixel data are transmitted through at least one of data channels according to a first clock cycle, part of the original pixel data transmitted through any one of the data channels is divided into N original pixel data groups according to the first clock cycle, and each of the original pixel data groups comprises a first original portion and a second original portion in a sequential arrangement;

the reorganized pixel data are transmitted through at least one of the data channels according to a second clock cycle different from the first clock cycle, part of the reorganized pixel data transmitted through any one of the data channels is divided into a plurality of reorganized pixel data groups according to the first clock cycle, and each of the reorganized pixel data groups comprises a first reorganized portion and a second reorganized portion in a sequential arrangement; and for any one of the data channels, the performing data reorganization on the original pixel data corresponding to at least one row of pixels in the display panel to obtain the reorganized pixel data comprises:

forming a first reorganized portion of an (n)th reorganized pixel data group by a first original portion of an (n−1)th original pixel data group, and forming a second reorganized portion of the (n)th reorganized pixel data group by a second original portion of an (n)th original pixel data group, wherein n is an integer satisfying $1<n\leq N$, and N is an integer greater than one.

2. The data conversion method according to claim 1, wherein for any one of the data channels, the N original pixel data groups are reorganized to obtain N+1 reorganized pixel data groups; and the performing data reorganization on the original pixel data corresponding to at least one row of pixels in the display panel to obtain the reorganized pixel data further comprises:

forming a first reorganized portion of a first reorganized pixel data group by arbitrary data, and forming a second reorganized portion of the first reorganized pixel data group by a second original portion of a first original pixel data group; and forming a first reorganized portion of an (N+1)th reorganized pixel data group by a first original portion of an (N)th original pixel data group, and forming a second reorganized portion of the (N+1)th reorganized pixel data group by arbitrary data.

3. The data conversion method according to claim 2, wherein for any one of the data channels, a size of bits of the first original portion is a size of data bits staggered by the second clock cycle with respect to the first clock cycle.

4. The data conversion method according to claim 2, wherein in each of the reorganized pixel data groups, a position of each data other than the arbitrary data is identical to a position of the data in the original pixel data group.

5. The data conversion method according to claim 2, wherein for any one of the data channels, the data conversion method further comprises:

receiving the N original pixel data groups sequentially, and caching at least x bits of data in the (n−1)th original pixel data group in a case of receiving the (n)th original pixel data group, wherein x is a size of data bits comprised in the first original portion;

wherein for any one of the data channels, the performing data reorganization on the original pixel data corresponding to at least one row of pixels in the display panel to obtain the reorganized pixel data comprises:

reorganizing the first original portion currently cached of the (n−1)th original pixel data group and the second original portion of the (n)th original pixel data group currently received to form the (n)th reorganized pixel data group.

6. The data conversion method according to claim 5, wherein for any one of the data channels, the performing data reorganization on the original pixel data corresponding to at least one row of pixels in the display panel to obtain the reorganized pixel data further comprises:

in a case of receiving the first original pixel data group, reorganizing x bits of arbitrary data and the second original portion of the first original pixel data group to form the first reorganized pixel data group.

7. The data conversion method according to claim 5, wherein for any one of the data channels, the performing data reorganization on the original pixel data corresponding to at least one row of pixels in the display panel to obtain the reorganized pixel data further comprises:

subsequent to receiving a last original pixel data group, caching at least x bits of data of the last original pixel data group, and reorganizing a first original portion cached of the last original pixel data group and y bits of arbitrary data to form a last reorganized pixel data group, wherein y is a size of data bits comprised in the second original portion.

8. The data conversion method according to claim 2, wherein for any one of the data channels, the data conversion method further comprises:

receiving the N original pixel data groups sequentially, and caching the N original pixel data groups received, wherein for any one of the data channels, the performing data reorganization on the original pixel data corresponding to at least one row of pixels in the display panel to obtain the reorganized pixel data comprises:

reorganizing a first original portion of a cached (n−1)th original pixel data group and a second original portion of a cached (n)th original pixel data group to form the (n)th reorganized pixel data group.

9. The data conversion method according to claim 8, wherein for any one of the data channels, the performing data reorganization on the original pixel data corresponding to at least one row of pixels in the display panel to obtain the reorganized pixel data further comprises:

reorganizing x bits of arbitrary data and a second original portion of a cached first original pixel data group to form the first reorganized pixel data group.

10. The data conversion method according to claim 8, wherein for any one of the data channels, the performing data reorganization on the original pixel data corresponding to at least one row of pixels in the display panel to obtain the reorganized pixel data further comprises:

reorganizing a first original portion of a cached last original pixel data group and y bits of arbitrary data to form a last reorganized pixel data group, wherein y is a size of data bits comprised in the second original portion.

11. The data conversion method according to claim 1, wherein each pixel in the at least one row of pixels comprises three sub-pixels, original pixel data corresponding to each of the three sub-pixels comprises 8 bits of data, and original pixel data corresponding to each pixel comprises 24 bits of data corresponding to the three sub-pixels, three control bits, and one vacant bit.

12. A data conversion device, comprising a receiving circuit and a reorganizing circuit, wherein the receiving circuit is configured to receive original pixel data corresponding to at least one row of pixels in a display panel; and the reorganizing circuit is configured to perform data reorganization on the original pixel data to obtain reorganized pixel data, wherein the original pixel data are transmitted through at least one of data channels according to a first clock cycle, part of the original pixel data transmitted through any one of the data channels is divided into N original pixel data groups according to the first clock cycle, and each of the original pixel data groups comprises a first original portion and a second original portion in a sequential arrangement;

the reorganized pixel data are transmitted through at least one of the data channels according to a second clock cycle different from the first clock cycle, part of the reorganized pixel data transmitted through any one of the data channels is divided into a plurality of reorganized pixel data groups according to the first clock cycle, and each of the reorganized pixel data groups comprises a first reorganized portion and a second reorganized portion in a sequential arrangement; and for any one of the data channels, the reorganizing circuit is configured to form a first reorganized portion of an (n)th reorganized pixel data group by a first original portion of an (n−1)th original pixel data group, and is configured to form a second reorganized portion of the (n)th reorganized pixel data group by a second original portion of an (n)th original pixel data group, wherein n is an integer satisfying 1≤n<N, and N is an integer greater than one.

13. The data conversion device according to claim 12, wherein for any one of the data channels, the N original pixel data groups are reorganized to obtain N+1 reorganized pixel data groups;

the reorganizing circuit is further configured to form a first reorganized portion of a first reorganized pixel data group by arbitrary data, and is configured to form a second reorganized portion of the first reorganized pixel data group by a second original portion of a first original pixel data group; and the reorganizing circuit is further configured to form a first reorganized portion of an (N+1)th reorganized pixel data group by a first original portion of an (n)th original pixel data group, and is configured to form a second reorganized portion of the (N+1)th reorganized pixel data group by arbitrary data.

14. The data conversion device according to claim 13, wherein for any one of the data channels, a size of bits of the first original portion is a size of data bits staggered by the second clock cycle with respect to the first clock cycle.

15. The data conversion device according to claim 13, further comprising a caching circuit, wherein for any one of the data channels, the receiving circuit is configured to receive the N original pixel data groups sequentially;

the caching circuit is configured to cache at least x bits of data in the (n−1)th original pixel data group in a case where the receiving circuit receives the (n)th original pixel data group, and x is a size of data bits comprised in the first original portion; and the reorganizing circuit is configured to reorganize the first original portion, currently cached by the caching circuit, of the (n−1)th original pixel data group and the second original portion of the (n)th original pixel data group, currently received by the receiving circuit, to form the (n)th reorganized pixel data group.

16. The data conversion device according to claim 15, wherein for any one of the data channels, the reorganizing circuit is further configured to reorganize x bits of arbitrary data and the second original portion of the first original pixel data group to form the first reorganized pixel data group in a case where the receiving circuit receives the first original pixel data group.

17. The data conversion device according to claim 15, wherein for any one of the data channels, the caching circuit is further configured to cache at least x bits of data of a last original pixel data group subsequent to the receiving circuit receiving the last original pixel data group; and the reorganizing circuit is further configured to reorganize a first original portion, cached by the caching circuit, of the last original pixel data group and y bits of arbitrary data to form a last reorganized pixel data group, wherein y is a size of data bits comprised in the second original portion.

18. A display device, comprising the data conversion device according to claim 12.

19. The display device according to claim 18, further comprising a display panel, wherein the receiving circuit and the reorganizing circuit are both integrated in a field programmable gate array, and in a case where the data conversion device comprises a caching circuit, the caching circuit is further integrated in the field programmable gate array; and the field programmable gate array is connected to a signal source to receive the original pixel data, and the field programmable gate array is further connected to the display panel to provide the reorganized pixel data for the display panel.

* * * * *